United States Patent
Myers

(10) Patent No.: US 9,513,187 B2
(45) Date of Patent: Dec. 6, 2016

(54) VALVE TESTING APPARATUS AND METHOD, ESPECIALLY SUITABLE FOR COMPRESSOR VALVE TESTING

(71) Applicant: Darryl Myers, Lafayette, LA (US)

(72) Inventor: Darryl Myers, Lafayette, LA (US)

( * ) Notice: Subject to any disclaimer, the term of this patent is extended or adjusted under 35 U.S.C. 154(b) by 49 days.

(21) Appl. No.: 14/612,685

(22) Filed: Feb. 3, 2015

(65) Prior Publication Data

US 2016/0223427 A1    Aug. 4, 2016

(51) Int. Cl.
*G01M 3/28* (2006.01)

(52) U.S. Cl.
CPC .................. *G01M 3/2876* (2013.01)

(58) Field of Classification Search
CPC ................................... G01M 3/2876
USPC ............................................. 73/47
See application file for complete search history.

(56) References Cited

U.S. PATENT DOCUMENTS 4,587,836 A    5/1986  Hewlett

*Primary Examiner* — Michael A Lyons
*Assistant Examiner* — Jean Morello
(74) *Attorney, Agent, or Firm* — Law Office of Jesse D. Lambert, LLC

(57) ABSTRACT

An apparatus for the testing of valves, particularly compressor valves, to ensure that the valve assemblies are pressure tight, has a valve holder which is generally conical shaped with a generally circular cross section when viewed from above, and a resilient inner wall surface. The valve holder has an open throat end, and a smaller diameter apex end. A pump or plenum for forming a below-atmospheric (vacuum) volume is fluidly connected to the apex of the valve holder. A valve is placed in the valve holder so as to seal against the resilient inner wall. A pressure differential is created across the valve by the vacuum source, and the pressure in the space below the valve is monitored to detect any leakage across the valve.

6 Claims, 4 Drawing Sheets

SECTION G-G

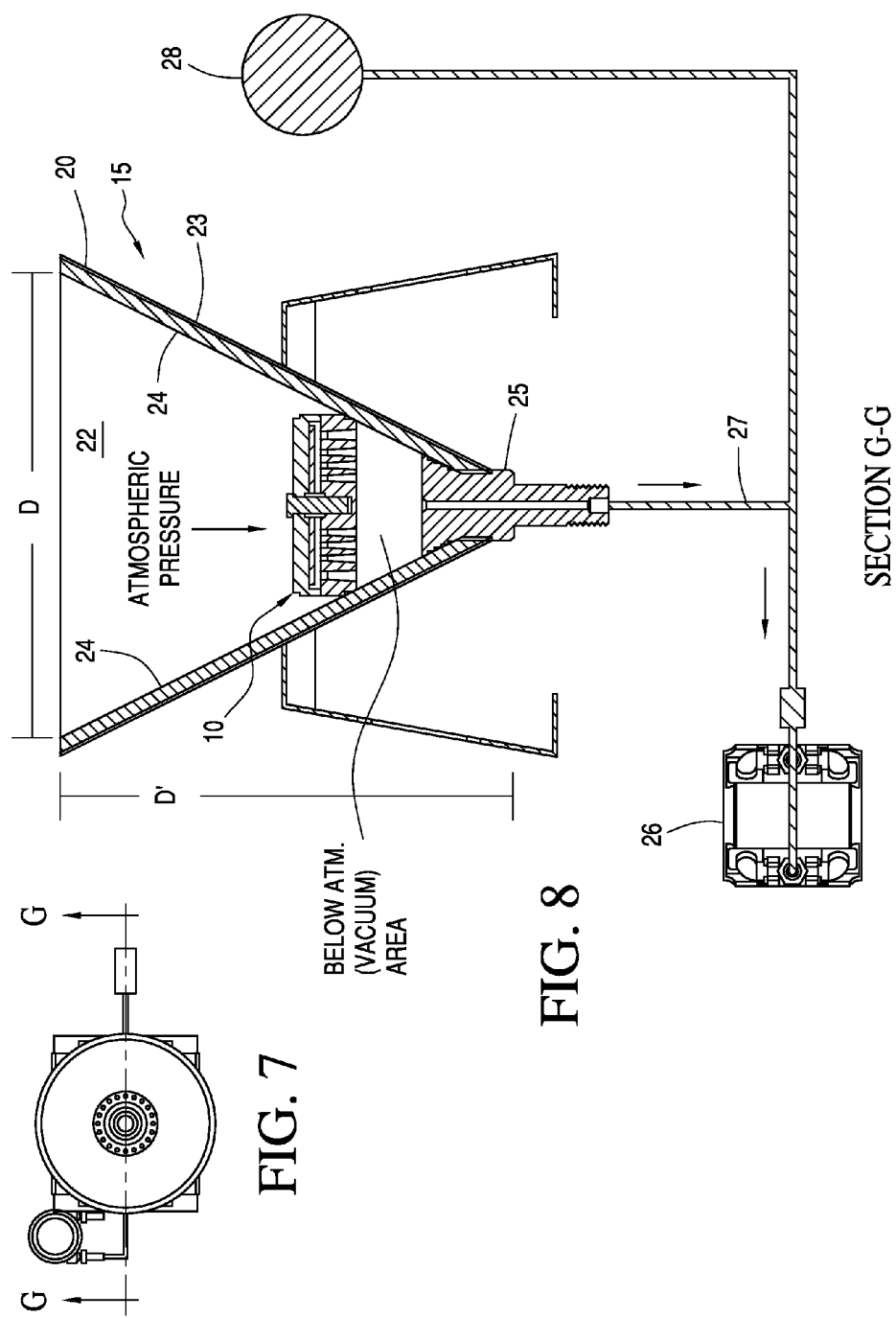

VALVE TESTING APPARATUS AND METHOD, ESPECIALLY SUITABLE FOR COMPRESSOR VALVE TESTING

CROSS REFERENCE TO RELATED APPLICATIONS

Not applicable.

BACKGROUND

Valves, namely compressor valves control fluid flow, namely gas flow, into and out of the compressor chamber. The valves are "check valves" in the sense that they permit gas flow in only one direction. Suction valves permit gas to flow into the compressor chamber, while discharge valves permit gas flow out.

Compressor valves 10, in their basic form (FIG. 1 shows a simplified cross section of a compressor valve), comprise a metal seat 100 having a plurality of passages therethrough, and a resilient plate 200 which movably engages seat 100, biased toward seat 100 by springs. The valve is spring biased closed. When plate 200 is displaced off of seat 100, fluid can flow through the valve. When plate 200 is forced against seat 100, plate 200 blocks the flow passages and therefore blocks flow through the valve. When viewed end-on, compressor valves are circular, as seen in FIG. 2.

Compressor valves are preferably tested after manufacture or repair, prior to installation into a compressor. Prior art methods included a liquid test, which placed a volume of liquid onto the plate (tending to push the plate off of the seat), to test whether the seal between the plate and the seat would withstand the weight of the water. Another method used a clamping device to pull the valve down to seal against an O-ring, after which a pressure differential could be applied across the valve seat. This method required multiple jig sizes for different size valves. All of the known prior art apparatus and methods have various disadvantages.

SUMMARY OF THE INVENTION

An apparatus for the pressure testing of valves, for example compressor valves, embodying the principles of the present invention, comprises a valve holder with a main body having an open cavity therein having a depth. The open cavity has an inner surface with a substantially circular cross section shape when viewed from above, and the cavity has a decreasing diameter over at least a portion of its depth when viewed from a side. The diameter of the cavity is adapted to accommodate the diameter of several sizes of compressor valves. The inner surface of the cavity is resilient, so that a compressor valve can seal against it. This resilient inner surface may comprise a resilient layer (e.g. a relatively soft rubber, plastic, poly-plastic, polyurethane or other suitable materials) overlaying a rigid base such as metal (whether steel, aluminum or other metals) or other suitable materials; or alternatively the main body may itself be formed from a resilient material. A means for creating a below-atmospheric pressure within said cavity below a valve positioned therein, which may be a pump or plenum, is fluidly connected to the cavity. A means for monitoring the pressure within said cavity below a valve positioned therein, which may be a pressure gauge, is also fluidly connected to the cavity.

In one embodiment of the principles of the present invention, the main body is generally funnel or cone shaped, tapering from an open mouth to an outlet in the throat or apex of the cone-shaped main body. As noted above, the main body is generally circular in cross section when viewed from above, with a resilient material lining the inner surface of the valve holder. A vacuum source, such as a pump, is connected to the outlet, and a pressure gauge permits measurement of the pressure within. It is understood that while in some of the presently preferred embodiments, the sides of the valve holder cavity in a side view comprise straight lines, in other embodiments the sides could define curved shapes.

To use the apparatus, a valve, which may be a compressor valve, is inserted into the open mouth of the main body, with the valve assembly at essentially a right angle to the vertical axis of the main body, until the valve seats against the resilient wall surface. A seal is thereby formed. It is understood that the one-way compressor valve is oriented to prevent flow from outside (above) the valve, to the cavity in the main body below the valve. With the pump, a below-atmospheric pressure (vacuum) is applied to the volume or cavity beneath the valve, and monitored to see if the vacuum is maintained. If the vacuum is maintained then the valve is shown to be non-leaking.

BRIEF DESCRIPTION OF THE DRAWINGS

FIG. 7 is a top view of another embodiment of the valve testing apparatus of the present invention.

FIG. 8 is a cross section view of the valve test apparatus of FIG. 7, along line G-G.

DESCRIPTION OF THE PRESENTLY PREFERRED EMBODIMENT(S)

While various compressor valve testers can embody the principles of the present invention, with reference to the drawings some of the presently preferred embodiments can be described.

The present invention is an apparatus and method of use which enables valve testing, particularly but not exclusively compressor valve testing, by creating a pressure differential across the valve, with the valve held in a test apparatus comprising a conical (or other suitable shape, as described below) shaped surface or valve holder, coupled to a means for creating a below-atmospheric pressure, which may be a pump or other vacuum source. The pressure differential thus created across the valve is atmospheric pressure on one side, and below-atmospheric pressure on the other side.

Figure 3:
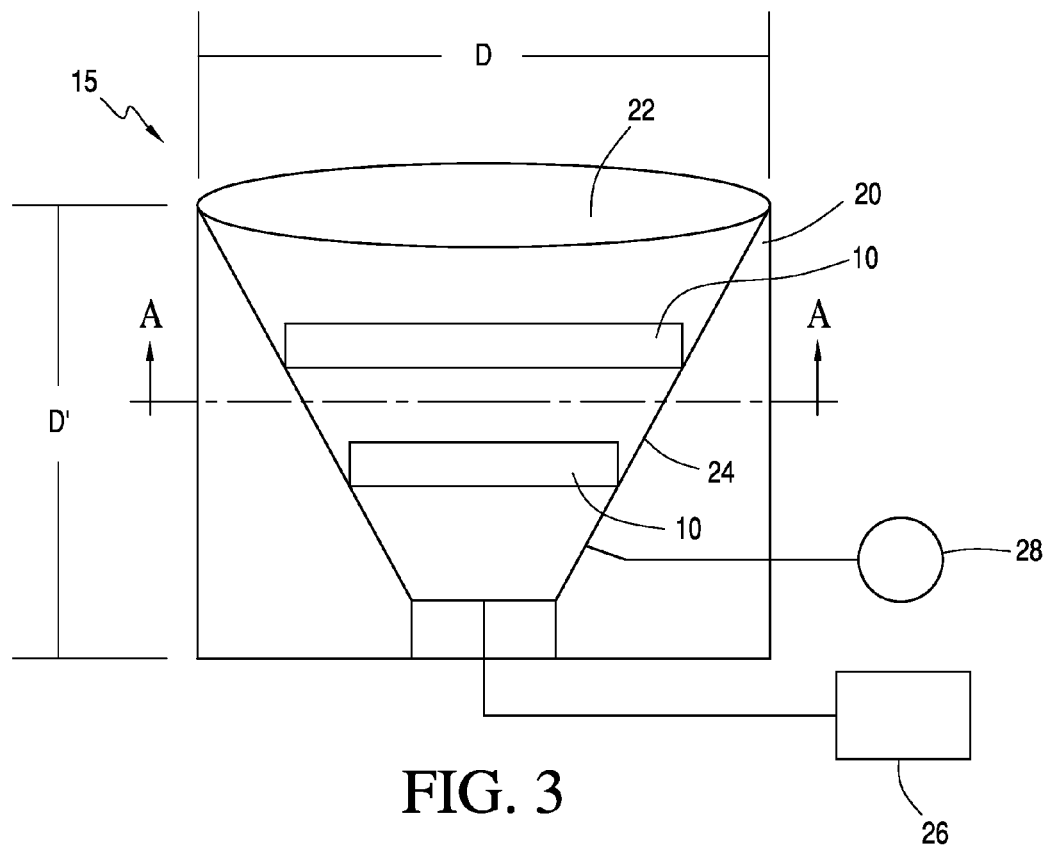
FIG. 3 is a cross section of an apparatus embodying the principles of the present invention.
Figure 4:
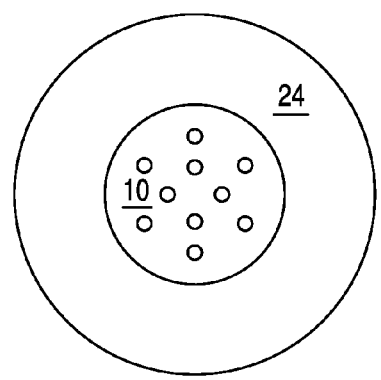
FIG. 4 is a top view along section line A-A of FIG. 3.
Figure 5:
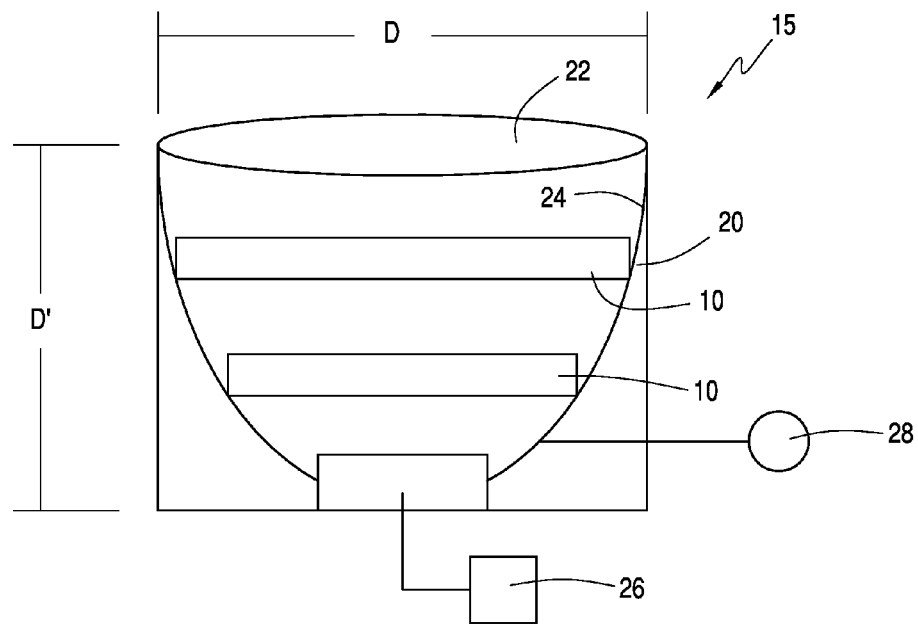
FIGS. 5 and 6 are cross section views showing alternative shapes (in side cross section) of different embodiments of the present invention.
Figure 6:
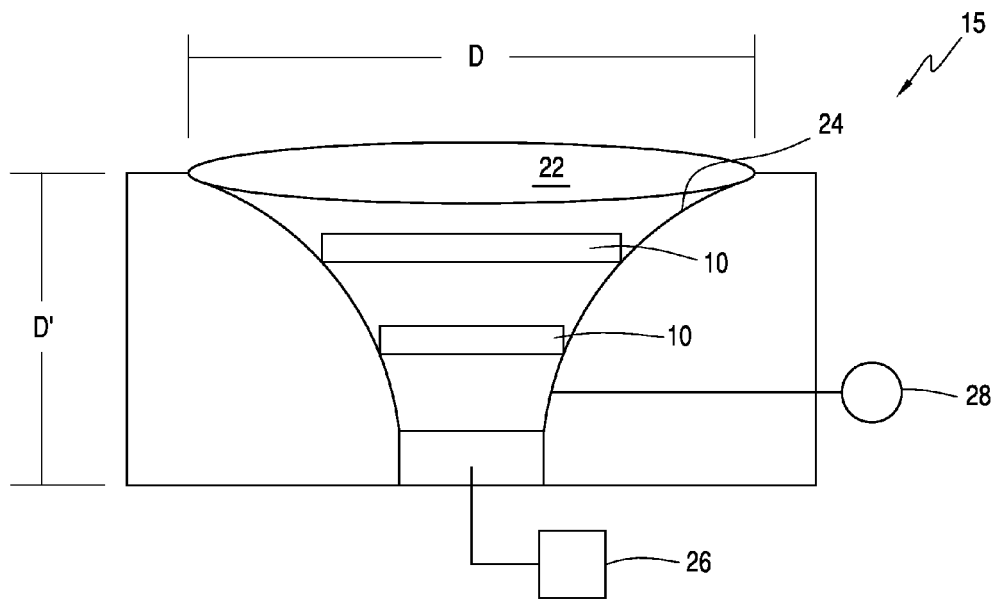

Referring to FIG. 3, broadly, pressure test apparatus 15 comprises a main body 20 with an open cavity 22 therein having a diameter D and depth D'. The wall or inner surface 24 of cavity 22 has a substantially circular cross section shape, as can be seen in FIG. 4 (that being a section line along A-A in FIG. 3). As can be readily seen from FIG. 3, the diameter D of cavity 22 decreases over at least a portion of its depth D' (that is to say, the diameter D is tapering with increasing depth D'). It can be readily appreciated that a valve 10 will seat at whatever position within cavity 22 that has a diameter corresponding to that of valve 10; two exemplary valves 10 are shown in position in FIG. 3, to illustrate the manner in which test apparatus 15 can accommodate valves 10 of different diameters (only one valve would be in place during testing). In FIGS. 3, 5 and 6, some of the detail of valve 10 is omitted for clarity.

Figure 1:
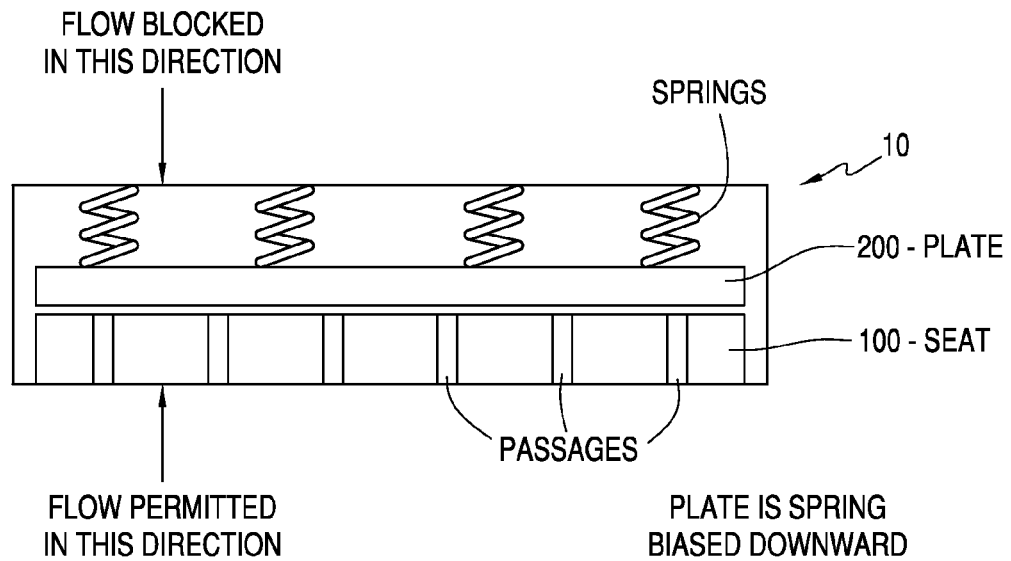
FIG. 1 is a cross-section view of a typical compressor valve, showing the plate and seat.
Figure 2:
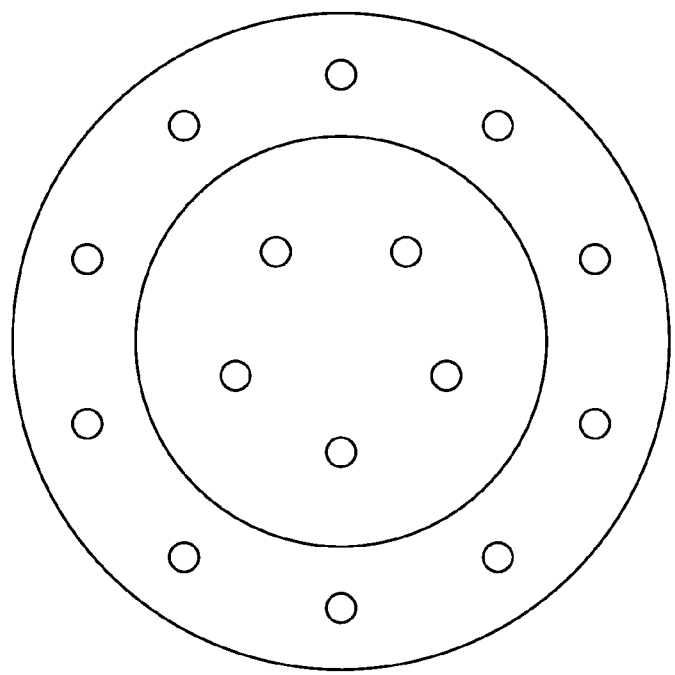
FIG. 2 is a top view of a typical compressor valve.

It is understood that valve 10 is oriented in main body 20 in the same orientation as in FIG. 1—namely, with the plate 200 spring biased downward against, and therefore sealing against, seat 100. In this orientation, assuming that the valve is sealing properly, flow in a downward direction (as the valve is oriented in FIG. 3), toward the apex of conical holder 20, is blocked. That is the condition which is to be tested.

The inner surface 24 is resilient, so that valve 10 can form a pressure seal when bearing against it. Various types of resilient material may be suitable, for example soft plastics, rubber, poly-plastics, polyurethane, etc. It is understood that inner surface 24 may be a resilient layer atop a harder supporting structure, or alternatively the entirety of main body 20 may be made of the resilient material. Main body may be made of various suitable materials, including but not limited to steel, aluminum, rigid composites, etc.

The pressure test apparatus 15 further comprises a means for creating a below-atmospheric pressure in cavity 22, below valve 10, denoted as element 26. In one presently preferred embodiment, means for creating a below-atmospheric pressure 26 comprises a pump and tubing. In another embodiment, means for creating a below-atmospheric pressure 26 comprises a plenum or other source of below-atmospheric pressure. A means for monitoring the pressure in cavity 22 is provided, which may be pressure gauge 28.

As is described in more detail below in connection with another embodiment, the method of testing a valve with the test apparatus is to seat a valve 10 within cavity 22, so that it seals against resilient inner surface 24, then create a below-atmospheric (vacuum) pressure within cavity 22 below valve 10. The pressure within the cavity below valve 10 is monitored; if the pressure remains at the below-atmospheric value first induced, then the valve is not leaking; on the other hand, if the pressure gradually increases toward atmospheric, then the valve is leaking and must be re-worked.

The present invention comprises a main body having a cavity with a side cross section shape having sides of other than straight lines, as in FIG. 3 (being substantially a conical shape); in FIGS. 5 and 6, the sides of the cavity form curved lines. FIG. 5 shows lines which are generally concave toward the inside of the cavity, while FIG. 6 shows lines which are generally convex toward the inside of the cavity. Both FIGS. 5 and 6 illustrate a cavity having circular top cross section shape, when viewed from above, and in which the diameter decreases with depth, over at least a portion of the depth of cavity 22. It is to be understood that other shapes, or combinations of shapes, may be used for cavity 22.

Another Embodiment of the Valve Tester

Referring to FIGS. 7 and 8, another embodiment of pressure test apparatus 15 is shown. Valve assembly 10 is shown in place within main body 20, which in this embodiment is substantially conical in shape with an open throat at a first end tapering to a smaller apex end; as can be seen in FIG. 8, diameter D of main body 20 decreases toward its apex (lower) end. As can be seen FIG. 7, main body 20 is circular in a top cross section view. Main body 20 comprises an outer shell 23, typically of thin metal or other suitable material, with a resilient inner layer 24. A means for creating a below-atmospheric pressure (vacuum) 26, which may be a pump or plenum, is connected to the apex of conical holder 20 by an insert 25, tubing 27, etc. as appropriate. A pressure gauge 28 is provided to monitor pressure in the control volume or cavity below valve assembly 10.

To use the tester, valve assembly 10 is placed in conical holder 20 until valve assembly seats therein, dependent on the diameter of valve assembly 10. A key advantage of the test apparatus is that a single conical holder 20 can accommodate a wide range of sizes of valve assemblies, as the assemblies are simply inserted into conical holder 20 until the valve assembly engages resilient inner layer 24. It is understood that a pressure seal is readily created between the perimeter of valve assembly 10, namely the metal seat 100, and resilient inner layer 24.

As noted above, it is understood that valve assembly 10 is oriented in conical holder 20 in the same orientation as in FIG. 1—namely, with the plate 200 spring biased downward against, and therefore sealing against, seat 100. In this orientation, assuming that the valve is sealing properly, flow in a downward direction (as the valve is oriented in FIG. 8), toward the apex of conical holder 20, is blocked. That is the condition which is to be tested.

The next step is to induce a pressure differential across valve assembly 10, in a downward (toward the apex of conical holder 20) direction, as noted in FIG. 8. The present invention does so by creating vacuum—below atmospheric pressure—below valve 10, by pulling a vacuum with the means for forming a below-atmospheric pressure (vacuum source) 26 (which may be a pump or below-atmospheric plenum) and the related fixture, tubing, etc. The location of the vacuum area or volume is noted in FIG. 8. Pressure gauge 28 permits monitoring of the pressure in this volume, which may be drawn down to pressures of 3 to 4 psi below atmospheric (or other suitable pressure values). It can be readily understood that if valve assembly 10 is sealing properly (that is, plate 200 sealing against seat 100), then the below-atmospheric pressure in this control volume will remain constant. Of course, such test is dependent also upon valve assembly 10 sealing properly against resilient inner layer 24.

Advantages of the present invention include the ability of a single test apparatus to accommodate a wide range of sizes (namely diameters) of valve assemblies; the ease and rapidity with which valve assemblies can be placed into and removed from the test apparatus, and the test pressure differential applied and held; and the increased safety of the test procedure.

CONCLUSION

While various specificities are set out above, regarding various embodiments of the principles of the present invention, it is to be understood that same are presented as examples and not by way of limitation. For example, dimensions can be altered to suit particular applications; the shape of the valve holder in side view may comprise straight, angled sides, or alternatively may comprise sides which are not straight lines but generally decrease in diameter in a direction toward the apex of the valve holder, for example curved lines of various possible shapes. Materials for the various components may be varied to suit particular applications. Various apparatus may be used to create the vacuum or below-atmospheric pressure in the cavity beneath the valve assembly, including various arrangements of pumps, tubing, reservoirs, etc. While the examples herein discuss use of the apparatus in connection with compressor valves, it is understood that the apparatus can be used to test a number of other types of valves, and the scope of the inventions encompasses such uses.

Therefore, the scope of the present invention is not limited by the examples given, but by the scope of the appended claims and their legal equivalents.

I claim:

1. An apparatus for the pressure testing of valves, comprising:
    a main body having an open cavity therein having a depth, said cavity having an inner surface with a substantially circular cross section shape, said cavity further comprising a decreasing diameter over at least a portion of its depth, said diameter adapted to accommodate the diameter of a generally circular valve, and wherein said inner surface is resilient;
    a means for creating a below-atmospheric pressure within said cavity; and
    a means for monitoring the pressure within said cavity.

2. The apparatus of claim 1, wherein said means for creating a below-atmospheric pressure comprises a pump, and wherein said means for monitoring the pressure within said cavity comprises a pressure gauge.

3. The apparatus of claim 2, wherein said cavity, in side view, comprises sides forming straight lines.

4. The apparatus of claim 2, wherein said cavity, in side view, comprises sides forming curved lines.

5. A compressor valve tester, comprising:
    a compressor valve holder comprising an elongated conical main body having a first open throat end with a diameter, decreasing in diameter toward a second apex end, said main body having a generally circular cross section shape when viewed from above, an inner wall of said main body forming a resilient surface;
    a pump fluidly connected to said main body proximal said apex end, said pump capable of creating a below-atmospheric pressure within said main body between said apex end and a compressor valve assembly sealingly disposed in said main body; and
    a pressure gauge fluidly connected to a space within said main body between said apex end and a compressor valve assembly sealingly disposed in said main body.

6. A method for pressure testing of compressor valves, comprising the steps of:
    inserting a compressor valve into a valve tester, wherein said valve tester comprises:
        a main body having an open cavity therein having a diameter and a depth, said cavity having an inner surface with a substantially circular cross section shape, said cavity further comprising a decreasing diameter over at least a portion of its depth, said diameter adapted to accommodate the diameter of a compressor valve assembly, and wherein said inner surface is resilient;
    placing said valve so that it seals against said resilient inner surface, with one side of said valve being exposed to atmospheric pressure, the other side of said valve being exposed to an interior volume within said cavity of said valve tester below said valve, said valve oriented so as to prevent flow into said cavity of said main body;
    creating a below-atmospheric pressure within said interior volume of said cavity below said valve; and
    monitoring said below-atmospheric pressure for changes thereto.

* * * * *